United States Patent
Svendsen et al.

(10) Patent No.: US 8,281,002 B1
(45) Date of Patent: Oct. 2, 2012

(54) METHOD AND SYSTEM FOR PROVIDING NOTIFICATION OF THE AVAILABILITY OF A PEER COMPUTER IN A PEER-TO-PEER NETWORK

(75) Inventors: Hugh Svendsen, Chapel Hill, NC (US); Alfredo Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2420 days.

(21) Appl. No.: 10/946,442

(22) Filed: Sep. 21, 2004

(51) Int. Cl.
*G06F 15/173* (2006.01)

(52) U.S. Cl. ......... 709/224; 709/226; 709/245; 713/201

(58) Field of Classification Search .................. 709/224, 709/226, 245, 220, 229; 713/201; 455/435.1
See application file for complete search history.

(56) References Cited

U.S. PATENT DOCUMENTS

| | | | |
|---|---|---|---|
| 6,981,047 B2 * | 12/2005 | Hanson et al. | 709/227 |
| 7,136,645 B2 * | 11/2006 | Hanson et al. | 455/435.1 |
| 7,194,543 B2 * | 3/2007 | Robertson et al. | 709/226 |
| 7,293,107 B1 * | 11/2007 | Hanson et al. | 709/245 |
| 7,389,533 B2 * | 6/2008 | Bartlett et al. | 726/15 |
| 7,610,207 B2 * | 10/2009 | Heins | 705/1.1 |
| 2003/0177396 A1 * | 9/2003 | Bartlett et al. | 713/201 |

* cited by examiner

*Primary Examiner* — Khanh Dinh
(74) *Attorney, Agent, or Firm* — Withrow & Terranova, PLLC (57) ABSTRACT

The invention includes a system and method for providing notification of the availability of a peer computer in a peer-to-peer network. The system includes a peer network server (PNS) configured to provide the peer-to-peer network. The PNS receives a request for access to the peer computer and determines whether the peer computer is connected to the peer-to-peer network. In the event that the peer computer is not connected to the peer-to-peer network at the time the request is received, the PNS provides a notification that the peer computer has connected to the peer-to-peer network after the peer computer connects to the peer-to-peer network.

34 Claims, 7 Drawing Sheets

METHOD AND SYSTEM FOR PROVIDING NOTIFICATION OF THE AVAILABILITY OF A PEER COMPUTER IN A PEER-TO-PEER NETWORK

FIELD OF THE INVENTION

The present invention relates to peer-to-peer online data sharing, and more particularly to a method and system for providing notification of the availability of a peer computer in a peer-to-peer network.

BACKGROUND OF THE INVENTION

Figure 1:
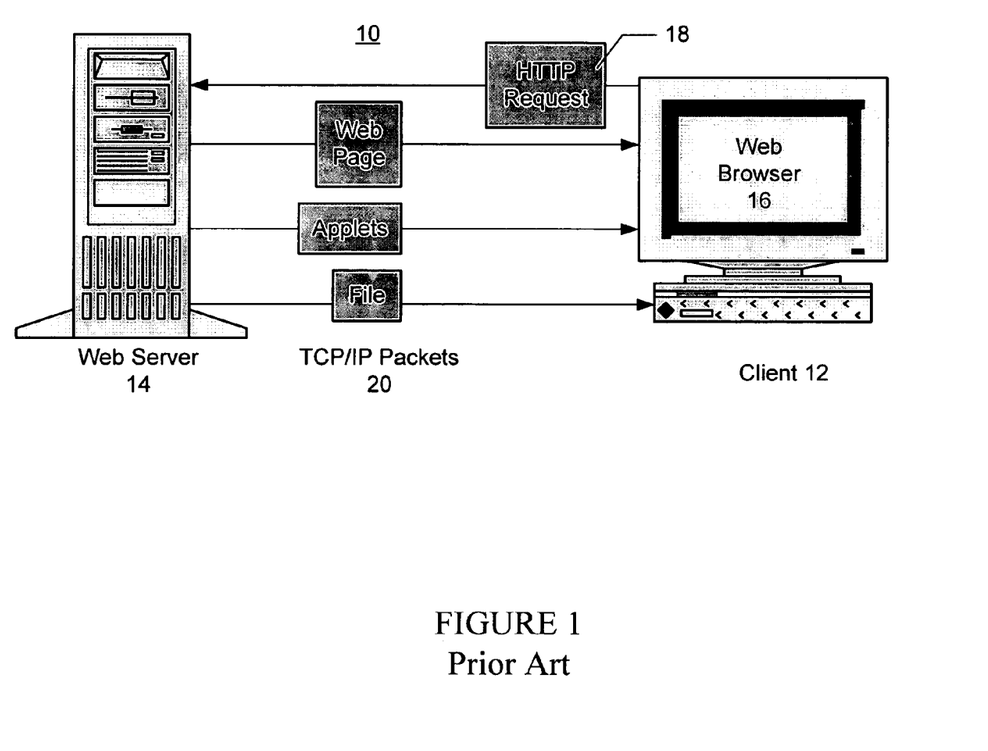
FIG. 1 is a diagram illustrating a conventional server architecture.

The most popular approach for online data sharing, in particular photos, is a serving architecture based on centralized computing, where a central server provides photosharing services to users by serving images to their web browsers from a fixed location on the Internet. FIG. 1 is a diagram illustrating a conventional server architecture 10 that includes a client 12 connecting to a Web server 14 through a web browser 16. Communication between the Web browser 16 and the Web server 14 is based on hypertext transport protocol (HTTP). The function of HTTP is to establish a connection between the Web browser 16 and the Web server 14 and to transmit HTML pages from the Web server 14 to the client browser 16 or any other files required by an HTTP application.

HTTP is a request/response system. The connection is maintained between client 12 and server 14 only for the immediate request. Using Transmission Control Protocol/Internet Protocol (TCP/IP), the Web browser 16 first establishes a TCP connection with the server 14, and then sends an HTTP request command 18 to the Web server 14. The Web server 14 responds by sending back TCP/IP packets 20 in the form of headers (messages) and files (HTML pages, Java applets, etc.), and then closes the connection. As is well-known, TCP/IP is a routable protocol where all messages contain not only the address of the destination station, but the address of a destination network. Every client 12 and server 14 in a TCP/IP network requires an IP address, which is either permanently assigned or dynamically assigned at startup.

This works reasonably well for many photosharing situations, especially with peer-to-peer (P2P) photosharing applications in which each peer computer in the P2P network acts as a server to share pictures with others in the network without the users having to upload their pictures to a Web site. One example of such a P2P application is Photo Vibe 1.2 by XFormx, Inc. of Needham, Mass. One problem with a photosharing P2P network is that an invitation to view pictures on one of the peer computers in the P2P network may be accepted at a time when the peer computer that issued the invitation is not available, e.g. the machine is turned off. Unlike a dedicated server that remains online nearly all of the time, most individuals turn off their machines (peer servers) when not using them. If the owner of the peer computer turns off their machine, halts the software connected them to the P2P network, or has an interruption in Internet service, a recipient of an invitation to view photos on such a network would be unable to do so during the period of time the peer server is offline. The recipient would access the photos primarily by luck.

Accordingly, what is needed is a method and system for providing notification of the availability of a peer computer in a peer-to-peer network. The present invention addresses such a need.

SUMMARY OF THE INVENTION

The present invention includes a system and method for providing notification of the availability of a peer computer in a peer-to-peer network. The system includes a peer network server (PNS) configured to provide the peer-to-peer network. The PNS receives a request for access to the peer computer and determines whether the peer computer is connected to the peer-to-peer network. In the event that the peer computer is not connected to the peer-to-peer network at the time the request is received, the PNS provides a notification that the peer computer has connected to the peer-to-peer network after the peer computer connects to the peer-to-peer network.

According to the method and system disclosed herein, the present invention provides a per peer, per guest monitoring and notification service. The invention increases the odds that the originally desired transaction is completed by resending information present in the original invitation. Additionally, the owner of the peer computer may be provided with who was attempting to view the content when the peer computer was offline. The invention does not require both the peer computer and the visiting computer to run the notification software in order for notification to work. Also, user names do not need to be exchanged in order for communication to take place. The invention works with either another peer computer trying to access the offline peer computer, or a visiting computer that is not part of the P2P network.

DETAILED DESCRIPTION OF THE INVENTION

The present invention relates to a method for providing notification of the availability of a peer computer in a peer-to-peer network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a notification system within a peer-to-peer (P2P) architecture for general data sharing that incorporates a central peer network server to coordinate availability of a peer computer with requests by guests to access data located on the peer computer that is offline. Although the embodiments described below are directed to an online photo album, one of ordinary skill in the art will recognize that the invention is applicable to any online data sharing. Also, while the below embodiments describe a visiting computer trying to access an offline peer computer, one of ordinary skill will recognize that the invention applies to two peer computers within the P2P network, one trying to access another that is offline.

Figure 2:
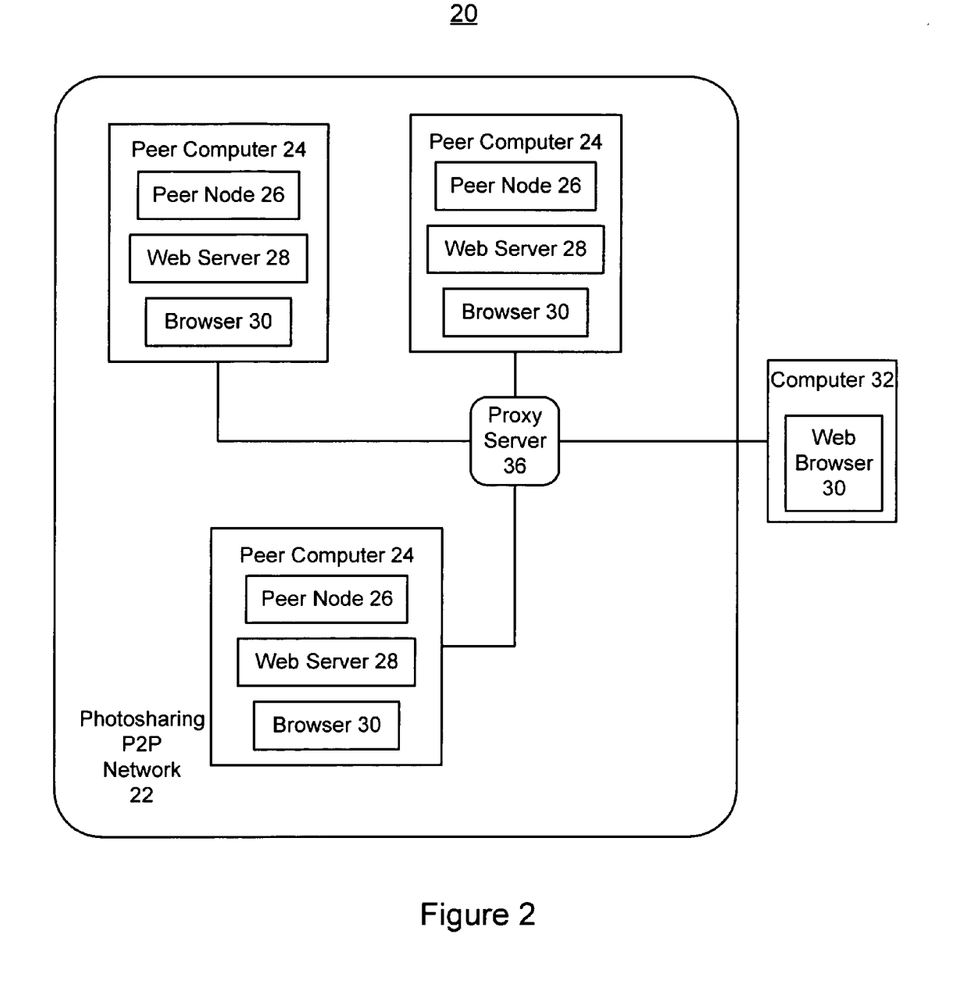
FIG. 2 is a diagram illustrating the hybrid peer-to-peer architecture of the present invention.

FIG. 2 is a diagram illustrating one embodiment of a peer-to-peer architecture of the present invention. The peer-to-peer architecture 20 includes a photosharing P2P network 22, which comprises multiple peer computers 24 running peer node software 26 and Web server software 28. In a preferred embodiment of the present invention, the peer node 26 and peer computer 24 enable the users of the computers to share pictures with others in the network through a Web browser 30 without having to upload their pictures to a Web site. A visiting computer 32, i.e., one not belonging to the peer-to-peer network 22, also accesses images from the peer computers 24 via a Web browser 30. As used herein, the peer computers 24 and the visiting computer 32 may comprise any computing device with components necessary for executing the appropriate software, such as PCs, workstations, cell phones, and PDAs, for instance. Also, in a preferred embodiment, the physical communications network is the Internet, although any type network could be used.

Generic HTTP access is accomplished by providing the P2P network 22 with at least one peer network server (PNS) 36 that is separate and apart from the peer computers 24 comprising the network 22.

Figure 3:
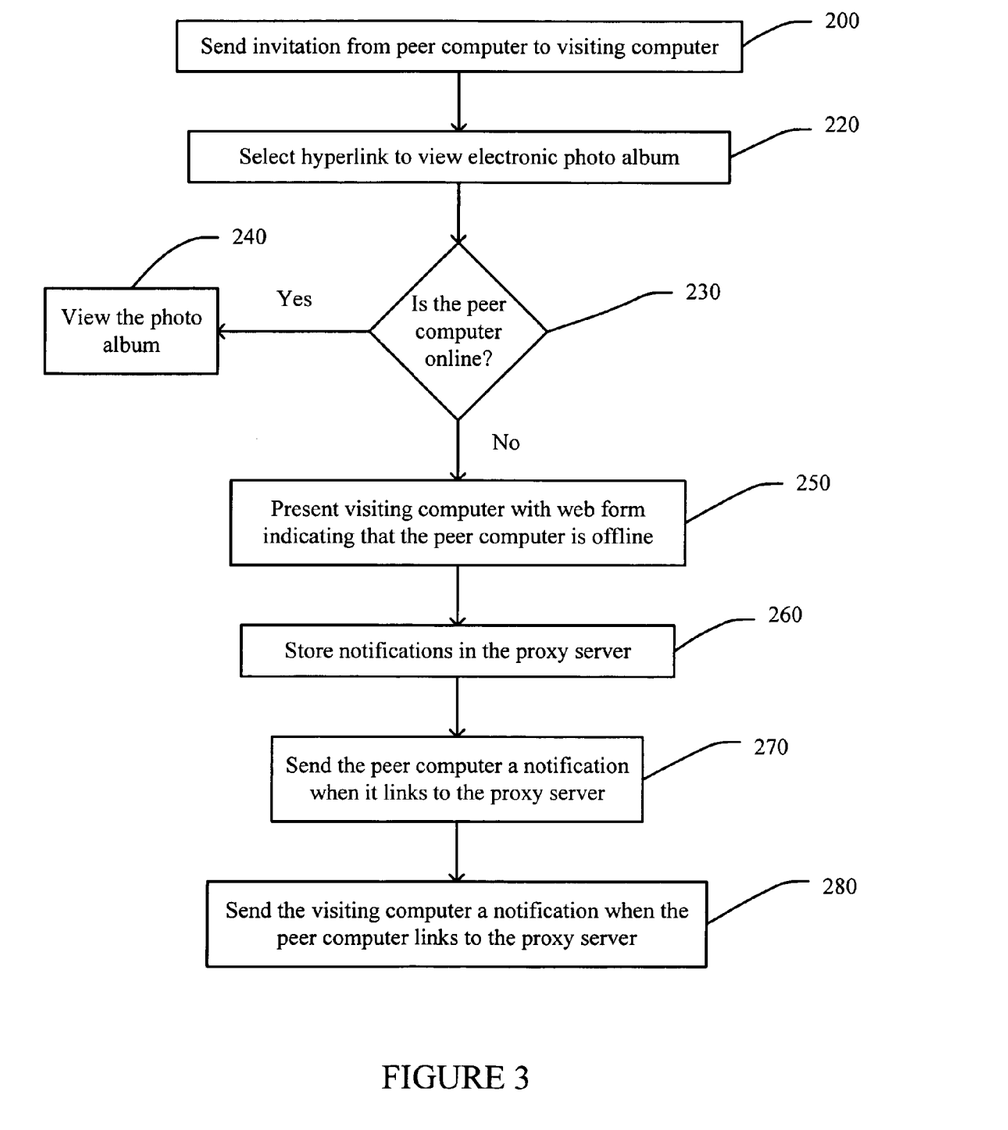
FIG. 3 is a flow diagram illustrating one embodiment of the invention implemented with the photosharing network of FIG. 3.

FIG. 3 is a flow diagram illustrating one embodiment of the process for notification in the photosharing network of FIG. 2. In block 200, one of the peer computers 24 sends a message, for example an email, inviting the visiting computer 32 to access data stored on peer computer 24, for example an online photo album. After receiving the message, in block 220 the user of visiting computer 32 selects a hyperlink, for example, to view the online photo album.

The hyperlink from the message directs the visiting computer 32 to PNS 36. PNS 36 determines, in block 230, whether the peer computer 24 that sent the message is online. If the peer computer 24 is online, then in block 240 the user of the visiting computer 32 may view the photo album.

If the peer computer 24 is offline, then in block 250 the PNS 36 sends a web page containing a form to the visiting computer 32 indicating that the peer computer 24 is offline.

Next, in block 260 the PNS 36 stores notifications related to the visiting computer's recent attempt to view the online photo album. Notifications may include a notification to the user of the peer computer 24 that the visiting computer 32 attempted to view the photo album, or a notification to the visiting computer 32 that the peer computer 24 is back online. Notifications may include the type of notification as described above, optional additional text, audio, etc. The type of content delivered is dependent on the destination of the notification (e.g. email, pager, cell phone, etc.)

For example, in block 270 the PNS 36 sends to the peer computer 24 a notification that the visiting computer 32 attempted to view the photo album while the peer computer 24 was offline.

Finally, in block 280 the PNS 36 might send the visiting computer 32 a notification when the peer computer 24 links back up with the PNS 36.

Figure 4:
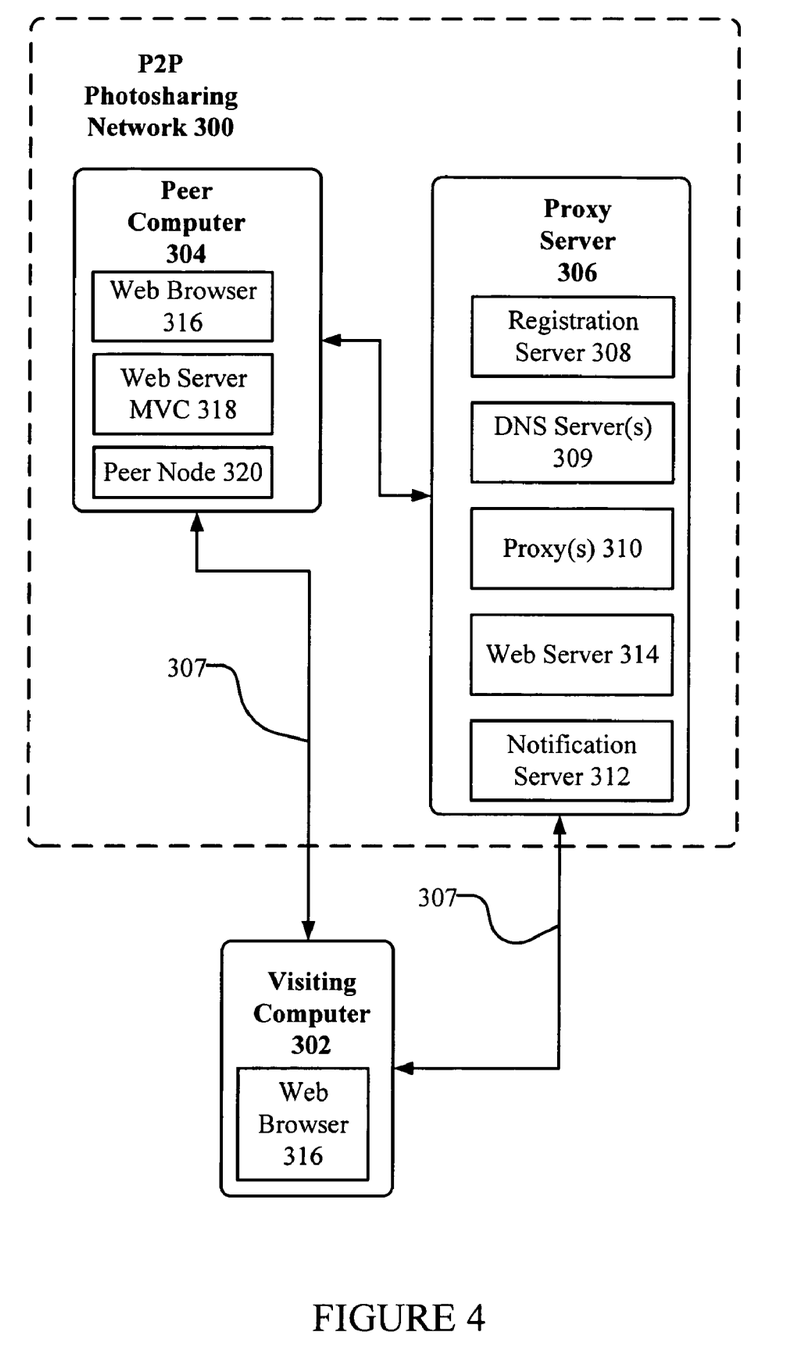
FIG. 4 is a block diagram illustrating one embodiment of a peer photosharing network connected to a visiting computer.

FIG. 4 is a block diagram illustrating a more detailed embodiment of photosharing P2P network 22 from FIG. 2.

P2P photosharing network 300 may be connected to a visiting computer 302. Peer photosharing network 300 may include peer computer (or server) 304 and PNS 306. Visiting computer 302 typically connects to peer computer 304 and PNS 306 through a network 307, for example the Internet. In one embodiment, the PNS 306 and peer computer 304 may be each connected to visiting computer 302. In another embodiment, the peer server 306 may provide peer computer 304 with the connection to visiting computer 302.

PNS 306 may include a registration server 308, which maintains a database of unique user names and associated settings for assignment to a new peer computer 304 joining the P2P photosharing network 300. Once a new peer computer 304 is assigned a user name, a DNS server 309 may provide network traffic routing to and from the peer computer 304 (through the PNS 306) by maintaining a list of dynamic peer names and open socket connections to those peers.

A proxy 310 handles hyper-text transfer protocol (HTTP) traffic between peer computer 304 and visiting computer 302. The DNS server 308 maintains a log of active peer computers 304 so that when the proxy 310 receives a request from the visiting computer 302 to view an album, the visiting computer 302 may be alerted if the peer computer 304 is offline, or the request may be sent through to the peer computer 304 to be acted upon. Notification server 312 may provide the alert to the visiting computer 302 that the relevant peer computer 304 is offline, as well as processing and storing other notification requests, for example: to which visiting computer 302 to send a notification that the peer computer 304 is back online.

PNS 306 also includes a web server 314, which may serve static and dynamic pages to the peer computers 304. Although PNS 306 is illustrated with different components, one of ordinary skill in the art will recognize that the PNS 306 may be implemented in one or more computers with the above logical functions.

Visiting computer 302 and peer computer 304 each include a web browser 316, which may be a standard HTTP browser. The peer computer 304 further may include web server model view controller (MVC) 318, which is a web server running applications written using a MVC model. Peer node 320 may allow incoming traffic from proxy 310.

Figure 5:
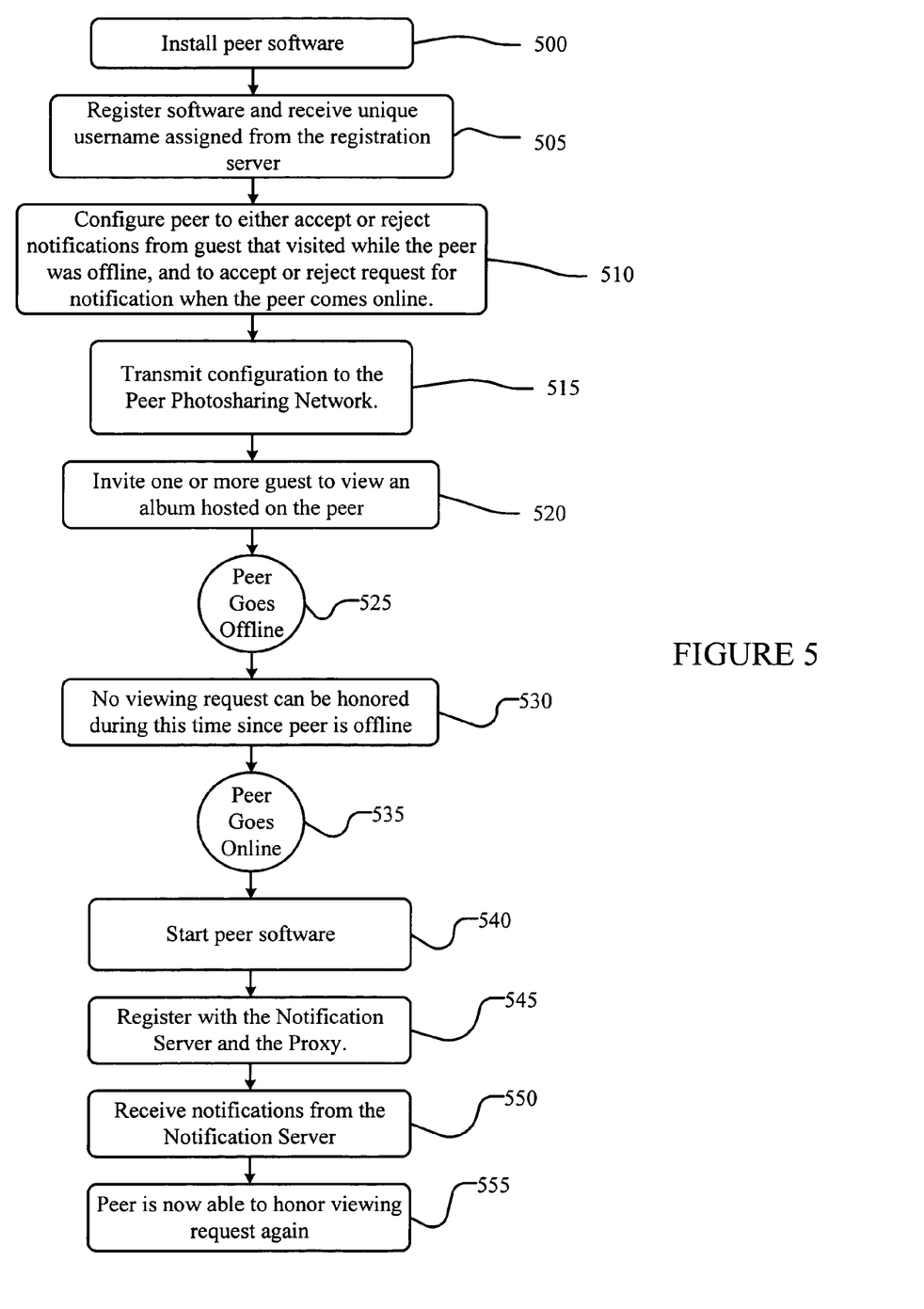
FIG. 5 is a flow diagram illustrating one embodiment of the invention implemented from the perspective of a user of peer computer with the P2P photosharing network of FIG. 3.

FIG. 5 is a flow diagram illustrating one embodiment of the process for notification from the perspective of a user of peer computer 304 in the P2P photosharing network 300 of FIG. 4. First, in block 500, a user installs peer software into peer computer 304. Peer software may include MVC 318 and peer node 320, for example. Then, in block 505, the user connects from peer computer 304 to PNS 306 and uses the peer software to register with the PNS 306. The registration server 308 assigns the peer computer 304 a unique username.

In block 510, the user may configure the peer computer 304, through the peer software, to either accept or reject notifications from a visiting computer 302 while the peer computer 304 was offline, and to accept or reject requests for notification when the peer computer 304 comes back online. In block 515, the user transmits the configuration to the PNS 306, which associates the configuration with the unique username assigned to and recognized as the peer computer 304.

Once the peer computer 304 joins the P2P photosharing network, in block 520 the peer computer 304 may issue one or more invitations to view an online photo album, for example, hosted on the peer computer 304. An invitation may be issued through email, for example. The invitations may issue through PNS 306, or directly from peer computer 304 to visiting computer 302 if there is a direct connection between the two.

At some point in time, in block 525, the peer computer 304 goes offline, perhaps because it is turned off, looses its Internet service provider (ISP) connection, or for some other reason. According to block 530, no viewing requests can be granted while the peer computer 304 is offline. Then, in block 535, the peer computer 304 goes back online by connecting again to PNS 306 and rejoining P2P photosharing network 300.

In block 540, the peer software in peer computer 304 begins running, whether automatically when peer computer 304 goes online, or at the command of the user. In block 545, peer computer 304 registers with notification server 312 and registration server 308. The notification server 312 stores notifications relating to peer computer 304, so in block 550 the peer computer 304 receives any notifications from the notification server 312. In block 555, peer computer 304 can now make available for viewing the online photo album to the visiting computer 302.

Figure 6:
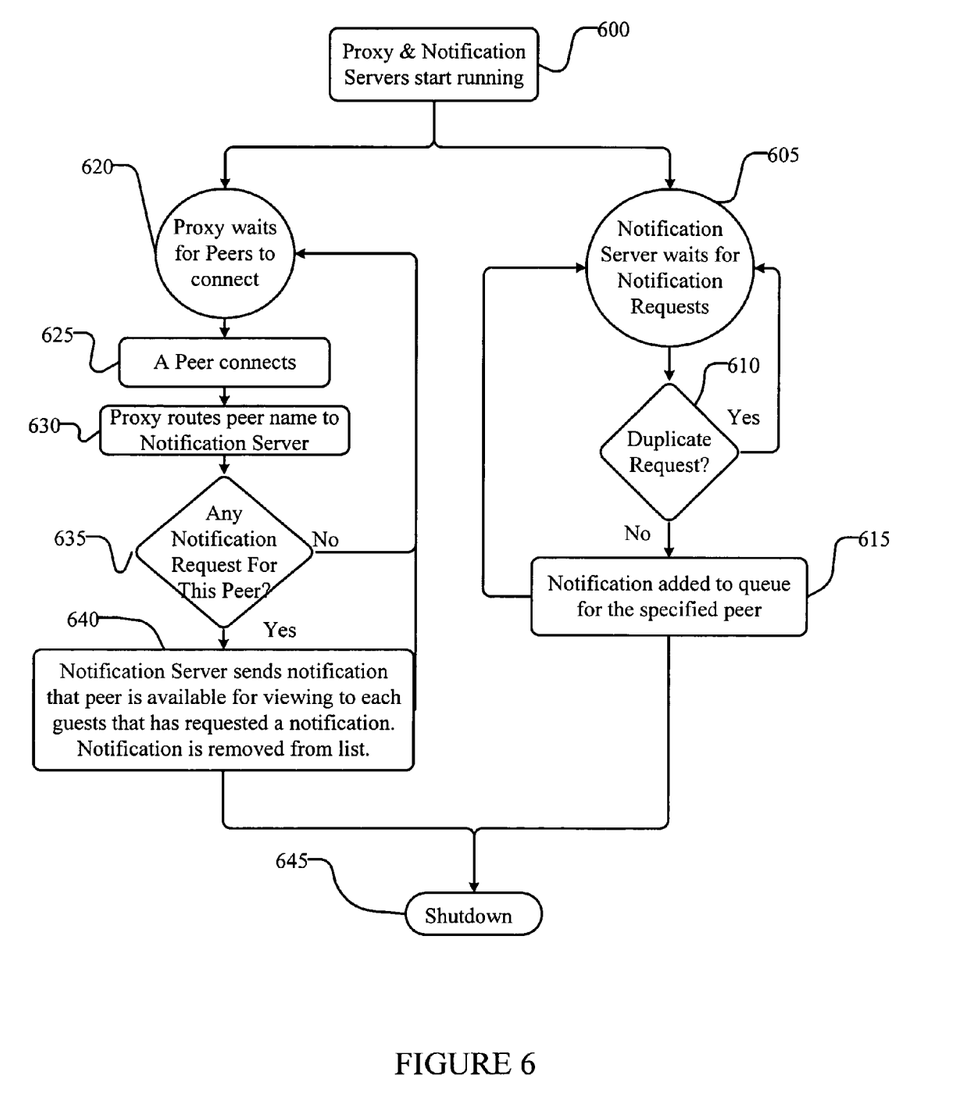
FIG. 6 is a flow diagram illustrating one embodiment of the invention implemented from the perspective of a peer network server (PNS) within the P2P photosharing network of FIG. 3.

FIG. 6 is a flow diagram illustrating one embodiment of the process for notification from the perspective of the PNS 306 in the P2P photosharing network 300 of FIG. 4. First, in block 600, PNS 306 and notification server 312 begin running when P2P photosharing network 300 is activated. The notification server 312 is prepared to receive notification requests, in block 605. Notification requests may be a request by a visiting computer 302 to be informed of when a peer computer goes online, or a notification to the peer computer 304 that the visiting computer 302 tried to view material on the peer computer 304. These requests are stored in the notification server 312 until they are sent. The configuration of peer computer 304 determines whether a notification request is generated.

Once the notification server 312 receives a notification request, it determines in block 610 whether the request is a duplicate request. A duplicate request is one that has already been stored in the notification server 312. For example, if a user named Charlie receives an email to view photos on peer computer 304, opens the link and discovers that peer computer 304 is offline, a notification request may be generated that is not a duplicate request. If Charlie later follows the link from the same email and discovers peer computer 304 is still offline, the notification request may be a duplicate because it was from Charlie, or from Charlie's visiting computer 302, or linked to from the email to Charlie. One of ordinary skill in the art will recognize that there are several different ways to track a visiting computer 302 or user and identify them as one that has communicated to the PNS 306 during a given time period in which the peer computer 304 is offline.

If the notification request is a duplicate, then the duplicate is not added to the queue of requests. If the notification request is not a duplicate, then in block 615 the notification is added to a queue associated with the peer computer 304.

While the notification server 312 is receiving or prepared to receive notification requests, proxy 310 is prepared for a peer computer 304 to connect, in block 620. In block 625, a peer computer 304 connects to P2P photosharing network 300.

In block 630, proxy 310 routes to the notification server 312 the unique name assigned by registration server 308 to peer computer 304.

In block 635, the notification server 312 determines if there are notification requests associated with the name for the peer computer 304. If there are no notification requests, then proxy 310 continues waiting for another peer computer to connect.

If there are notification requests for the peer computer 304, then in block 640 the notification server 312 sends out the notifications stored for the peer computer. One example of a notification is that peer computer 304 is online, sent to visiting computer 302. Once the notification requests are sent out, PNS 306 continues waiting for peer computers 304 to access it, unless PNS 306 is shutdown in block 645.

Figure 7:
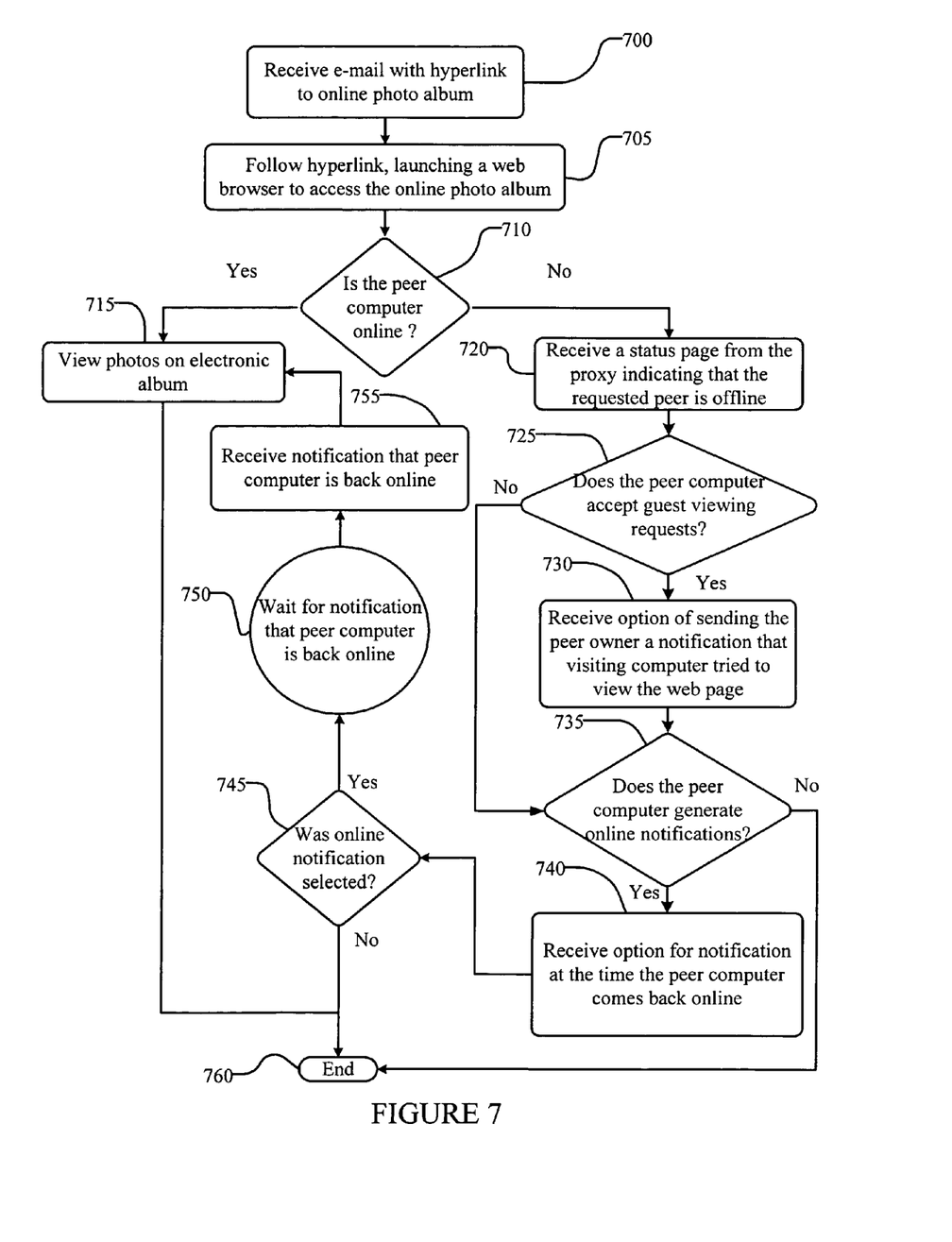
FIG. 7 is a flow diagram illustrating one embodiment of the invention implemented from the perspective of a visiting computer within the P2P photosharing network of FIG. 3.

FIG. 7 is a flow diagram illustrating one embodiment of the process for notification from the perspective of a user of the visiting computer 302 in the P2P photosharing network 300 of FIG. 4. In block 700, a user of visiting computer 302 receives an email from peer computer 304 with a hyperlink to view an photo album stored on peer computer 304 and available online. In block 705, the user follows the hyperlink by selecting it, thereby launching web browser 316 to access the online photo album.

In block 710, the user of visiting computer 302 learns whether peer computer 304 is online when the user tries to access the online photo album. If the peer computer 304 is online, then in block 715 the user may view the photos from peer computer 304.

If the peer computer 304 is offline, then in block 720 the user of visiting computer receives a status page from the proxy 310 indicating that the requested peer computer 304 is offline.

Block 725 is a split whereby if PNS 306 is configured to accept guest viewing requests for the peer computer 304, then the option is presented to the user. If the peer computer 304 is configured to accept requests, then in block 730 the user of visiting computer 302 receives the option of sending the peer computer 304 a notification that the user of visiting computer 302 tried to view the online photos while the peer computer 304 was offline.

If the peer computer 304 is not configured to accept requests, or after block 730, then in block 735 there is a split whereby if the PNS 306 is configured to generate online notification for the peer computer 304, then the option is presented to the user of visiting computer 302. If the peer computer 304 is configured to generate online notification, then in block 740 the user of visiting computer 302 receives an option for notification at the time the peer computer 304 comes back online.

In block 745, the user of visiting computer 302 may either accept or reject the option for notification. If the user of visiting computer 302 selects the option for online notification, then in block 750 the user will wait for notification that the peer computer 304 is back online.

Once the peer computer 304 goes back online, a notification is sent from PNS 306 to visiting computer 302 that the peer computer 304 is back online, as illustrated in block 755.

The user of visiting computer 302 is able to view the photos online, in block 715. Finally, the process ends for the user in block 760 after viewing photos in block 715, or after blocks 745 or 735.

A system and method for providing notification of the availability of a peer computer in a peer-to-peer network has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for providing notification of the availability of a peer computer in a peer-to-peer network, comprising:
receiving a request from a requestor for access to the peer computer;

determining with a peer network server (PNS) whether the peer computer is connected to the peer-to-peer network; and in the event that the peer computer is not connected to the peer-to-peer network:

providing a notification from the PNS to the requestor that the peer computer has connected to the peer-to-peer network after the peer computer connects to the peer-to-peer network when the peer computer is not connected to the peer-to-peer network at the time the request is received; and adding the notification to a queue associated with the peer computer.

2. The method of claim 1 further comprising:

in the event that the peer computer is not connected to the peer-to-peer network, providing a notification to the peer computer, after the peer computer connects to the peer-to-peer network, that a request for access to the peer computer was received.

3. The method of claim 2 further comprising:

in the event that the peer computer is not connected to the peer-to-peer network, providing an option for the notification that a request for access to the peer computer was received.

4. The method of claim 3 further comprising:

directing the option for the notification to the peer computer.

5. The method of claim 3 further comprising:

directing the option for the notification to a visiting computer.

6. The method of claim 1 further comprising:

in the event that the peer computer is not connected to the peer-to-peer network, providing an option for the notification that the peer computer has connected to the peer-to-peer network.

7. The method of claim 6 further comprising:

directing the option for the notification to the peer computer.

8. The method of claim 6 further comprising:

directing the option for the notification to a visiting computer.

9. The method of claim 1, the PNS further comprising a notification server, the notification server providing the notification that the peer computer has connected to the peer-to-peer network after the peer computer connects to the peer-to-peer network.

10. The method of claim 9, adding the notification to a queue associated with the peer computer further comprising:

determining if the request for access to the peer computer is a duplicate request; and in the event that the request is not a duplicate request, adding the notification to the queue associated with the peer computer.

11. The method of claim 9 further comprising:

receiving a connection from the peer computer;

routing the identity of the peer computer to the notification server; and determining if the queue associated with the peer computer contains the notification.

12. A computer-readable medium containing program instructions for providing notification of the availability of a peer computer in a peer-to-peer network provided by a PNS, the program instructions comprising:

processing a request for access to the peer computer;

determining whether the peer computer is connected to the peer-to-peer network; and in the event that the peer computer is not connected to the peer-to-peer network:

providing a notification that the peer computer has connected to the peer-to-peer network after the peer computer connects to the peer-to-peer network when the peer computer is not connected to the peer-to-peer network at the time the request is received; and adding the notification to a queue associated with the peer computer.

13. The computer-readable medium of claim 12, the program instructions further comprising:

in the event that the peer computer is not connected to the peer-to-peer network, providing a notification to the peer computer, after the peer computer connects to the peer-to-peer network, that a request for access to the peer computer was received.

14. The computer-readable medium of claim 13, the program instructions further comprising:

in the event that the peer computer is not connected to the peer-to-peer network, providing an option for the notification that a request for access to the peer computer was received.

15. The computer-readable medium of claim 14, the program instructions further comprising:

directing the option for the notification to the peer computer.

16. The computer-readable medium of claim 14, the program instructions further comprising:

directing the option for the notification to a visiting computer.

17. The computer-readable medium of claim 12, the program instructions further comprising:

in the event that the peer computer is not connected to the peer-to-peer network, providing an option for the notification that the peer computer has connected to the peer-to-peer network.

18. The computer-readable medium of claim 17, the program instructions further comprising:

directing the option for the notification to the peer computer.

19. The computer-readable medium of claim 17, the program instructions further comprising:

directing the option for the notification to a visiting computer.

20. The computer-readable medium of claim 12, the PNS further comprising a notification server, the notification server providing the notification that the peer computer has connected to the peer-to-peer network after the peer computer connects to the peer-to-peer network.

21. The computer-readable medium of claim 20, adding the notification to a queue associated with the peer computer further comprising:

determining if the request for access to the peer computer is a duplicate request; and in the event that the request is not a duplicate request, adding the notification to the queue associated with the peer computer.

22. The computer-readable medium of claim 20, the program instructions further comprising:

receiving a connection from the peer computer;

routing the identity of the peer computer to the notification server; and determining if the queue associated with the peer computer contains the notification.

23. A peer network server (PNS) for providing notification in a peer-to-peer network, comprising:

memory; and a control system associated with the memory and configured to:
  maintain the peer-to-peer network for a peer computer configured to hold data;
  receive a request from a requestor for access to the data in the peer computer; and
  determine whether the peer computer is connected to the peer-to-peer network; and;
  in the event that the peer computer is not connected to the peer-to-peer network:
    provide a notification to the requestor that the peer computer has connected to the peer-to-peer network after the peer computer connects to the peer-to-peer network when the peer computer is not connected to the peer-to-peer network at the time the request is received; and
    add the notification to a queue associated with the peer computer.

24. The system of claim 23, the PNS further configured, in the event that the peer computer is not connected to the peer-to-peer network, to provide a notification to the peer computer, after the peer computer connects to the peer-to-peer network, that a request for access to the peer computer was received.

25. The system of claim 24, the PNS further comprising:
a notification server configured to store and to provide the notification to the peer computer and the notification to the requestor.

26. The system of claim 25, the PNS further configured, in the event that the peer computer is not connected to the peer-to-peer network, to provide an option for the notification that a request for access to the peer computer was received.

27. The system of claim 26, wherein the PNS is further configured to direct the option for the notification to the peer computer.

28. The system of claim 26, wherein the PNS is further configured to direct the option for the notification to the requestor, wherein the requestor is a visiting computer.

29. The system of claim 23 wherein the PNS is further configured, in the event that the peer computer is not connected to the peer-to-peer network, to provide an option for the notification that the peer computer has connected to the peer-to-peer network.

30. The system of claim 29, wherein the PNS is further configured to direct the option for the notification to the peer computer.

31. The system of claim 29, wherein the PNS is further configured to direct the option for the notification to the requestor, wherein the requestor is a visiting computer.

32. The system of claim 23, the PNS further comprising a notification server, the notification server providing the notification that the peer computer has connected to the peer-to-peer network after the peer computer connects to the peer-to-peer network.

33. The system of claim 32, the notification server further configured to determine if the request for access to the peer computer is a duplicate request, and in the event that the request is not a duplicate request, to add the notification to the queue associated with the peer computer.

34. The system of claim 32 wherein the PNS is further configured to receive a connection from the peer computer and to route the identity of the peer computer to the notification server, wherein the notification server is further configured to determine if the queue associated with the peer computer contains the notification.

* * * * *